United States Patent

[11] 3,622,767

| [72] | Inventor | Richard W. Koepcke<br>San Jose, Calif. |
|---|---|---|
| [21] | Appl. No. | 609,415 |
| [22] | Filed | Jan. 16, 1967 |
| [45] | Patented | Nov. 23, 1971 |
| [73] | Assignee | International Business Machines Corporation<br>Armonk, N.Y. 10504 |

[54] ADAPTIVE CONTROL SYSTEM AND METHOD
8 Claims, 2 Drawing Figs.

[52] U.S. Cl. .................................................... 235/150.1,
235/151.1, 318/561, 318/636
[51] Int. Cl. ........................................................ G06f 15/46,
G05b 13/02
[50] Field of Search........................................... 235/150.1,
151.1, 151.11, 151.12, 151.13, 151.31, 151.35,
151.34, 184; 318/561

[56] References Cited

UNITED STATES PATENTS

| 2,972,447 | 2/1961 | White.............................. | 235/184 |
|---|---|---|---|
| 3,086,709 | 4/1963 | Simmon et al. ................ | 235/184 |
| 3,167,665 | 1/1965 | Godby et al. ................... | 235/184 |
| 3,196,430 | 7/1965 | Oken et al. ..................... | 235/184 |
| 3,201,572 | 8/1965 | Yetter............................. | 235/151 |
| 3,419,772 | 12/1968 | Ross............................... | 235/151.1 X |
| 3,149,270 | 9/1964 | Smyth et al. .................. | 318/20.050 |
| 3,221,230 | 11/1965 | Osburn.......................... | 235/150.1 X |
| 3,287,615 | 11/1966 | Smyth............................ | 235/150.1 X |
| 3,327,306 | 6/1967 | Ellert et al. ................... | 318/20.050 X |

OTHER REFERENCES

McGrath et al., Parameter-Perturbation Adaptive Control System, IRE Transactions on Automatic Control, Vol. AC-6, May, 1961, pp. 154- 162.

*Primary Examiner*—Malcolm A. Morrison
*Assistant Examiner*—Felix D. Gruber
*Attorney*—Fraser and Bogucki

ABSTRACT: A control system of the adaptive type in which the applicable control law is chosen from a finite set of possibilities, with changes between the control laws being effected dependent upon the relative changes in system performance, without relation to external performance standards. As performance varies, comparisons between successive values for the chosen criteria are continually made and the system shifts between individual control laws within the available set of control laws to tend toward optimum performance for the conditions under which the system is then operating.

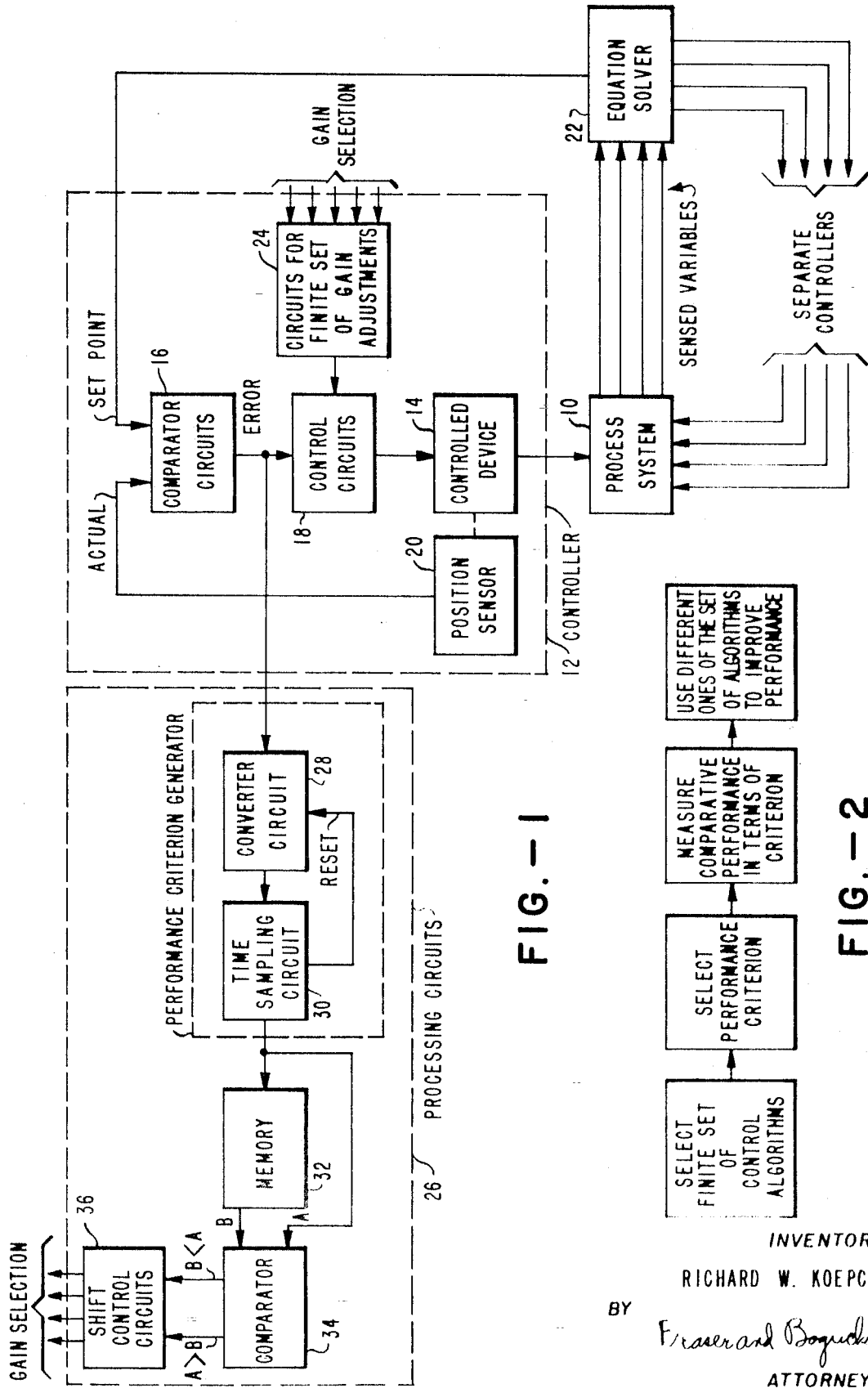

ADAPTIVE CONTROL SYSTEM AND METHOD

BACKGROUND OF THE INVENTION

1. Field of the Invention

This invention relates to control systems and more particularly to systems of the type that adapt their operating characteristics to the conditions under which they operate.

2. Description of the Prior Art

The type of response which a control system exhibits is affected by many factors, including system gain and various disturbances both external and internal. With conventional control systems, a desired overall response in the system being operated is achieved by setting gains in individual control loops and by providing control or command signals for the control loops in accordance with predetermined control laws involving a number of variables being measured. If the control laws are adjusted to provide optimum response for typical conditions, however, it is inherent that there is some sacrifice of response or performance under nontypical conditions. In a process control system, for example, unusual states exist during starting, stopping and system overload conditions. Typically, a compromise must be made between performance, system complexity, and the amount of effort that can be expended in analyzing system parameters, even if only steady state conditions are considered.

Adaptive controls have been utilized to enable control systems to provide satisfactory performance under a number of conditions. In broad terms, an adaptive control system observes in some manner the performance of the system under control, and modifies the governing criteria, simply or in a complex fashion, where necessary and possible to achieve better system performance. In more advanced modern systems, a number of process variables are sensed, and interrelated in accordance with a specified control law and to generate a control system. The governing control law is modified in some fashion to generate a new control signal when by periodic determination it is found that particular conditions exist under which improvement is feasible.

Simple examples of adaptive controls are found in analog systems having two modes of operation. In some such systems, depending upon predetermined criteria, the system may shift automatically from proportional control to a combination of proportional and reset control when there is a substantial excursion in a variable or in an error signal. In other systems, circuits may be incorporated that automatically function in a different fashion when conditions change. Thus, in servo circuits it is known to utilize nonlinear impedances to adjust system time constants in accordance with the magnitude of an error signal. In these systems, however, there must be a detailed understanding of the control function being performed, in order that the performance criteria can be properly set and appropriate selection made between the alternative modes of operation.

Such systems represent rudimentary forms of adaptive control, but the art in general tends toward the utilization of adaptive control in more complex environments. Particular examples may be found in the operation of integrated industrial plants with multiloop control systems, each of the loops being operated in accordance with its own control equation related to particular variables. Adaptive control has greatest potential for such applications because of the flexibility and versatility inherent in a control system that is able to operate any of a variety of similar or dissimilar processing or fabricating installations with a minimum of adjustment and modification. In most control systems applications, a thorough understanding of the controlling parameters is required for proper overall performance. Adaptive systems are of particular promise where they can be used to substantially decrease the time and expense involved in control analysis, without requiring costly or complex equipment.

SUMMARY OF THE INVENTION

Systems in accordance with the invention modify the manner in which a control system operates, in one of a predetermined set of ways, in accordance with the performance of the system itself. A suitable performance criterion, which need not be precisely determined relative to system characteristics, is used in conjunction with one of a finite set of control laws chosen for the system. The system compares successive values derived for the performance criterion, and shifts sequentially between the alternatives in a predetermined fashion, to tend to optimize performance by using the best control law available.

In more specific examples of systems in accordance with the invention, a closed loop controller that is externally set by an associated system is provided with an externally selectable finite set of gain adjustments. Performance criteria for the closed loop controller are established in accordance with the error signal history of the system, such as the sum of the errors squared, over selected sample intervals. Each sample value for the performance criterion is compared to the next preceding value and the relative values indicate the trend of the quality of performance. The comparison results govern a shift control system that successively shifts the closed loop controller through the set of gain adjustments in a sense to improve the value of the performance criterion. When either limit of the set is reached the system continues to test in the opposite direction.

This invention includes a new methods of interrelating measured and calculated variables in a process. It involves taking a series of measurements, performing certain mathematical operations on the values obtained by these measurements, and then adjusting certain variables in accordance with the results obtained form the computation. The invention it not a computer program for performing the computation but rather it is a control technique, or, more explicitly, the invention is a specific method of adjusting the setting of a process variable in accordance with signals obtained.

BRIEF DESCRIPTION OF THE DRAWINGS

Objects and advantages other than those indicated above will be apparent from the following description, taken in conjunction with the accompanying drawing, in which:

FIG. 1 is a block diagram of a representation of a system in accordance with the invention; and FIG. 2 is a block diagram of the steps utilized in a method in accordance with the invention.

DESCRIPTION OF THE PREFERRED EMBODIMENT

Systems and methods in accordance with the invention may be better understood with reference to FIG. 1, in which the principle functional units of a modern closed loop controller 12 for a process system 10 are illustrated in block diagram form. It will be appreciated that in a conventional process control system 10, a substantial number of closed loop controllers are utilized, and that these may operate with individual control circuits or in multiplex fashion. For simplicity of description, only a single loop is described herein, and it is assumed that this single control loop incorporates a separate controller 12 which receives a desired set point value and operates a controlled device 14 that governs a specific variable, such as a flow or temperature in the process system. The controller 12 is shown, for ease of description, as including separately identified comparator circuits 16, providing error indications and a position sensor 20 that is responsive to the controlled device 14. Those skilled in the art will understand that closed loop systems of this nature may employ advanced circuits in which functional units are highly interrelated. They may further incorporate conventional means for manual adjustment of setting points, determination of alarm and limit conditions, and use of various auxiliary control features.

The controller 12 operates in response to set point values derived from an independent control system, here referred to as an equation solver 22. The equation solver 22 is typically an analog or digital process control system that processes a number of input variables derived from the process system 10, to provide commands, output records, and such other functions s are desired. However, the set point for controller 12 could be provided manually without affecting system operation.

In the controller 12, the control circuits 18 incorporate means for establishing various operative control laws. Here these means are shown as a finite set of gain adjustment circuits 24, any one of which may be activated by an external control signal to vary the forward gain of the controller 12. The gain adjustment circuits 24 might, on the other hand, comprise a simple network for coupling applied input voltages of various levels to the control circuits 18. The representation shown is for clarity of understanding, inasmuch as the gain may be adjusted in these and in a variety of other ways, including the application of digital gain control signal for setting the gain value.

The gain adjustment circuits 24 are responsive to indications from processing circuits 26 that receive the error signal from the controller 12. The broad term "processing circuits" is chosen because it is specifically intended, as will be described below, that many of a wide variety of expedients can be used in accordance with the invention. The processing circuits 26 are described as special purpose digital circuits corresponding to various well-known circuits, although they have not been shown in detail because they are understood by those skilled in the art. They may also, however, be analog in nature, or adjusted manually or may comprise portions of a general purpose digital computer arranged to operate using methods in accordance with the invention.

The processing circuits 26 include a converter circuit 28 generating signal samples representing the error history of the system. The converter generates a predetermined quantity here $$\sum_{k=1}^{n} E^2_k$$

, where E is the error signal, this quantity hereafter being referred to as the sum of the errors squared. Other values, such as the sum of the absolute error, the sum of the root mean square value, or the integral of the error may be used in appropriate circumstances. For the sum of the errors squared, the error signal value sampled and converted may be in an analog to digital converter to an equivalent digital value, this value may be multiplied by itself, and then the product may be continuously summed over a selected interval. A time-sampling circuit 30, which repetitively operates, resets the converter circuit 28 after a chosen time interval The interval may be empirically determined relative to the bandwidth of the error signal and the reset times for the set point in the controller 12. The converter circuit 28 and the time-sampling circuit 30 represent what may be termed a performance criterion generator, in that the successive output signals provided indicate the quality of performance of the controller 12, as represented by variations in the sum of the errors squared. The converted error signal is shown as being coupled through the time-sampling circuit 30, although it will be appreciated that gating, switching or register arrangements may be employed in different combinations. It will also be understood by those skilled in the art that although appropriate analog circuits can perhaps more simply mechanize the function of converting the error signal to the sun of the errors squared, such circuits are of course subject to problems of drift and are not amenable to multiplexing or use for other purposes at other times in the operation of this system.

The performance criterion sample (A) is applied to a memory circuit 32 and also to a comparator 34 which also receives the next preceding performance criterion sample (B) from the memory 32. Dependent upon the relative magnitudes of each performance criterion (A) with its immediate predecessor (B), the comparator 34 provides an appropriate relative magnitude indication to operate shift control circuits 36 controlling the gain adjustment circuits 24 in the controller 12. For each signal indicative of a relative magnitude relationship, the shift control circuits 36 shift forward or reverse one position, in accordance with the sense needed to improve the quality of performance. In this example, an increase in the value of the performance criteria indicates lower performance and initiates a reversal in the direction of shift. The shift control circuits 36 may therefore comprise a conventional shift control network successively operated by the time-sampled signals from the time-sampling circuit 30 so as to change from one of the finite set to another in an appropriate sense. When reaching either limit of the finite set, the shift control circuits 36 automatically tend to shift in the opposite direction. Thus the system does not become locked at either limit of the finite set, but continues to attempt to find an improved performance value. The shift control circuits 36 may also comprise a conventional ring circuit which shifts in either direction under forward and reverse signals.

The operation of the controller 12, the process system 10 and the equation solver 22 of FIG. 1 need only briefly by described. Sensed variables derived from the process system 10 by the equation solver 22 are used in the generation of an appropriate set point for the particular controller 12. The comparator circuits 16 generate an error signal from the relationship of the desired set point to the actual set point of the controlled device 14, and the control circuits 18 provide suitable forward gain, together with such lead-lag compensation and other adjustments as are desired for appropriate servo bandwidth and stability.

Adaptive control systems in accordance with the present invention achieve superior performance by using circuits 24 that provide a finite set of gain adjustments, in conjunction with the processing circuits 26 that select gain to tend to optimize performance During controller 12 operation, the signal generator that receives the error signal provides successive performance criteria sample. Each sequential pair of performance criteria samples are compared by the memory 32 and comparator 34 circuits, to identify only relative, not absolute, changes in performance quality. The signal indications A>B and B>A thus are used to trigger an appropriate shift in the forward gain value, through operation of the shift control circuits 36. When a shift in the forward gain results in an indication that the quality of performance has degraded, the ensuing shift is in the opposite direction.

Thus in using a finite set of what may be termed operating modes control laws or control algorithms the system does not seek to achieve continuous operation with an ideal control law. Recognizing that the ideal control is neither achievable nor necessary, the finite set is chosen to cover a selected range, and the differences between individual members of the set are appropriately proportioned to the range to be covered. That is, for a substantial range of values, a greater number of control laws is employed. Selection of the limits of the set and the number of members within the set, however, does not demand close analysis of the system being controlled. Instead, the designer may use systems in accordance with the invention without being required to investigate why violations of performance criteria have occurred. He is not required to compare performance criteria to an external standard or to choose and define such a standard.

Methods in accordance with the invention utilize the steps broadly set out in FIG. 2. A finite set of control algorithms is selected for an adaptive control system, and a performance criterion is also selected. There may of course by a number of criteria inasmuch as relative changes in the quality of performance can be indicated by other relationships than by the changes in one criterion alone. The comparative performance is then measured in terms of the criterion and different ones of the set of control algorithms are used to improve the performance. More specifically, changes in the sense of the quality of performance with changes in the control algorithm are used for control, so that the system operates in what may be said to be a subjective fashion. A further aspect of the methods in accordance with the invention, however, is that the system continues to search when reaching the limit of the range, and thus shifts away from what may be a superior operating mode at the limiting condition. As pointed out above, however, some sacrifice of performance is tolerated under these conditions because superior overall performance is sought to be obtained without substantial complication of the system or excessively detailed analysis of the operative system.

Although forward gain adjustment of the controller is used in the present example, the finite set of control algorithms may be entirely different in nature, and need not, in methods in accordance with the invention, be concerned with the controller gain. Instead, the invention comprehends that any finite set of control algorithms, such as those used in generating a set point, may be utilized in a similar fashion, in conjunction with an appropriately related performance criterion. Thus excursions in any error signal or some other variable characteristic of performance may be successively compared, and an analog or digital system for mathematical computation may utilize different control equations, to provide varying set point adjustments. In utilizing a general purpose digital computer in accordance with the invention, an error signal or other basis for a performance criterion may be sampled at an appropriate rate, the appropriate performance criterion developed, successive comparisons made and different control algorithms chosen from a finite set in accordance with the results of the comparisons to continuously seek to improve performance. If a computer is employed, variations in the gain settings may themselves be monitored to provide a basis for analysis of the process system under control. The successive determinations of performance criteria and employment of different ones of the finite set of algorithms may also be accomplished manually by an operator observing the comparative performance of the system.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. The method of operating a control system to improve system performance that includes the steps of:
   monitoring variations in a selected criterion of performance of the system and generating a variation during each successive time intervals;
   establishing for the control system a finite set of operative control conditions covering selected performance range, the differences between individual ones of the finite set being appropriately proportioned over said performance range;
   and shifting between adjacent conditions in the finite set of operative control conditions in response to said variation signal in each successive time interval to seek to improve the criterion of performance for the next time interval.

2. The method of operating a control loop to control a device that includes the steps of:
   generating criterion of variations in an error signal in the control loop during successive time intervals;
   comparing changes in the criterion between each of successive time intervals; and generating a favorable or unfavorable indication signal as a result of the comparison;
   utilizing one of a finite set of gain control values in the operation of the control loop during each time interval;
   and shifting to an adjacent gain control value in response to each comparison signal the direction of shift being in the same direction each time the comparison signal is favorable and being reversed in the other direction whenever the comparison signal is unfavorable.

3. The method of operating a control loop controller having a set point value and tending to maintain a control device at the set point position by generating an error signal including the steps of:
   repetitively computing the sum of the error signal squared over a selected interval and generating a sum signal;
   comparing the results of successive sum signals to determine the increase or decrease of the sum signals;
   and shifting the forward gain of the controller to an adjacent gain value of a finite set of gain values in accordance with the results of each comparison, the direction of shift being in the same direction each time the comparison shows a relative decrease and being reversed whenever the comparison shows a relative increase.

4. The invention as set forth in claim 3 above wherein the comparing step is accomplished by storing the results of one computation and comparing the results with the results of the next succeeding computation, and wherein during the step of sifting, the direction of sift is reversed whenever the end of the finite set is reached.

5. An adaptive control system comprising:
   a closed loop controller having a finite set of individually selectable operating modes, the individual modes of said set covering an operating range, the difference in magnitude between adjacent individual modes being appropriately proportioned to the range to be covered;
   an error-indicating circuit responsive to operation of the controller for indicating the quality of performance thereof during a selected time interval;
   a comparator circuit responsive to successive indications from the error-indicating circuit for indicating the relative nature of successive changes in the quality of performance;
   and shift control circuits for shifting the closed loop controller to an adjacent operating mode in response to each indication from the comparator circuit even when the controller is in an optimum operating mode before they shift, the direction of shift being reversed whenever the relative nature of successive changes and the quality of performance are undesirable 6. A process control system in which at least one control variable is to be maintained at selected set points under varying conditions, including the combination of:
   an equation solver system responsive to variables in the process system and indicating selected set points for the controlled variable;
   a closed loop controller having a selectable finite set of operating modes, and including a controlled device controlling the controlled variable and a device coupled to the controlled device for indicating the actual set point of the controlled variable, the controller generating an error signal indicative of the variation between actual and selected set points during operation;
   an error signal comparator circuit responsive to the error signal from the controller and providing a signal time sample indicative of variations therein during successive time intervals;
   a comparator circuit responsive to the comparator circuit for comparing the successive time sampled variations in the error signal to indicate relative changes and the quality of performance;
   and shift control circuits shifting to an adjacent operating mode in response to each comparison of the comparator circuit irrespective of whether the controller was in an optimum mode before the shift.

7. A closed loop controller for a controlled device operating in response to chosen settings and including an actual setting indicator, said controller comprising:
   first comparator circuits responsive to the chosen settings and actual settings for generating an error signal;
   controlled circuits having a finite set of operating modes, and being responsive to the error signal and operating the controlled device;

a signal generator circuit responsive to the error signal for providing indications of performance during successive time intervals;

a memory circuit responsive to the indications of performance;

a second comparator circuit coupled to the memory circuit and to the signal generator circuit to compare each indication of performance with the succeeding indication of performance and to indicate relative changes in the quality of performance between each successive time interval;

and shift control circuits shifting the operating mode to an adjacent operating mode and the finite set at the end of each successive interval in response to the relative changes indicated by the second comparator circuit.

8. Closed loop controller as set forth in claim 7 above, wherein the finite set of operating modes for the controlled circuits represents a number of gain adjustments, wherein the signal generator circuit provide signals corresponding to the sum of the errors squared, and wherein said shift control circuits reverse direction of shift upon reaching either limit of said finite set and when relative changes indicated by the comparator circuit are unfavorable.

* * * * *